(12) United States Patent
Ostermeier et al.

(10) Patent No.: US 8,199,885 B2
(45) Date of Patent: Jun. 12, 2012

(54) METHOD AND APPARATUS FOR TRANSMITTING EMERGENCY MESSAGES

(75) Inventors: Robert Ostermeier, Rochester, IL (US); Budd L. Schubert, North Royalton, OH (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1422 days.

(21) Appl. No.: 11/751,275

(22) Filed: May 21, 2007

(65) Prior Publication Data

US 2008/0291849 A1 Nov. 27, 2008

(51) Int. Cl.
*H04M 11/00* (2006.01)
(52) U.S. Cl. ............................... 379/45; 379/46; 379/37
(58) Field of Classification Search ............... 379/37–45; 340/286.02, 531, 539.1, 539.11; 455/404.1, 455/567
See application file for complete search history.

(56) References Cited

U.S. PATENT DOCUMENTS

| | | | |
|---|---|---|---|
| 7,054,612 B2 | 5/2006 | Patel | |
| 7,551,730 B2 * | 6/2009 | Li et al. | 379/93.23 |
| 2005/0070247 A1 * | 3/2005 | Larson et al. | 455/404.1 |
| 2005/0237183 A1 * | 10/2005 | Lamb | 340/539.11 |
| 2007/0052533 A1 | 3/2007 | Glazer | |
| 2007/0066366 A1 * | 3/2007 | Graham | 455/567 |
| 2007/0136743 A1 * | 6/2007 | Hasek et al. | 725/33 |
| 2008/0018452 A1 * | 1/2008 | McCarthy et al. | 340/531 |
| 2008/0057955 A1 * | 3/2008 | Choi-Grogan | 455/435.1 |

FOREIGN PATENT DOCUMENTS

EP 1544825 A1 * 6/2005

* cited by examiner

*Primary Examiner* — Melur Ramakrishnaiah
(74) *Attorney, Agent, or Firm* — Woodcock Washburn LLP

(57) ABSTRACT

A method and apparatus for transmitting emergency messages is disclosed. A system that incorporates teachings of the present disclosure may include, for example, a communication device, of a communication system, having a controller element to send a selection of types of emergency alert messages to be transmitted to one or more associates of a subscriber corresponding to the communication device; and receive an emergency alert message of a public emergency alert system for a zone of coverage, wherein the subscriber is in the zone of coverage and wherein the emergency alert message is transmitted to one or more associate communication devices of each of the one or more associates according to the selection of types of emergency alert messages to be transmitted. Additional embodiments are disclosed.

28 Claims, 4 Drawing Sheets

200 ic # METHOD AND APPARATUS FOR TRANSMITTING EMERGENCY MESSAGES

FIELD OF THE DISCLOSURE

The present disclosure relates generally to communication systems, and more specifically to a method and apparatus for transmitting emergency messages.

BACKGROUND

Generally, an emergency alert system (EAS) transmits alert messages such as severe weather warnings by way of radio and TV stations. When end users are away from their home or without access to a radio they generally cannot receive EAS alerts directed to their local area. Such messages may not give enough of an advance warning, especially for individuals who need assistance or may not receive the warning.

A need therefore arises for a method and apparatus for transmitting emergency messages.

DETAILED DESCRIPTION

Figure 1:
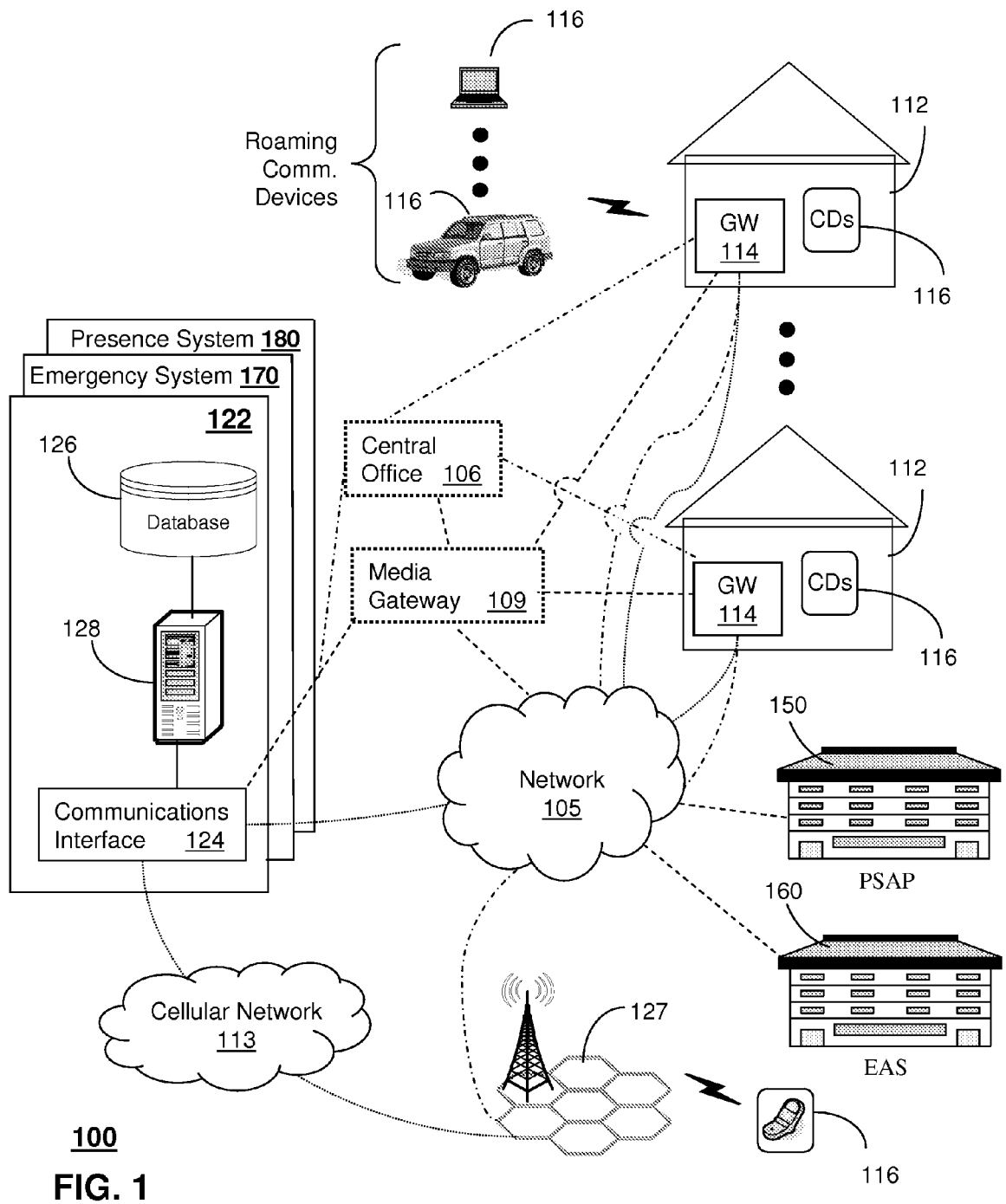
FIGS. 1 and 2 depict exemplary embodiments of a communication system.

Embodiments in accordance with the present disclosure provide a method and apparatus for transmitting emergency messages.

In a first embodiment of the present disclosure, a computer-readable storage medium of a communication system can have computer instructions for: detecting an emergency alert message broadcast by a public emergency alert system for a zone of coverage; identifying one or more subscribers of the communication system that are in the zone of coverage; identifying one or more associate communication devices for each of one or more associates of the one or more subscribers; providing types of emergency alert messages to be transmitted to the one or more associate communication devices; receiving a selection of the types of emergency alert messages to be transmitted; receiving associate presence information corresponding to the one or more associate communication devices; and transmitting the emergency alert message to at least one of the one or more associate communication devices based on the associate presence information when the emergency alert message corresponds to the selection of the types of emergency alert messages to be transmitted.

In a second embodiment of the present disclosure, a communication device of a communication system can have a controller element to send a selection of types of emergency alert messages to be transmitted to one or more associates of a subscriber corresponding to the communication device; and receive an emergency alert message of a public emergency alert system for a zone of coverage, wherein the subscriber is in the zone of coverage and wherein the emergency alert message is transmitted to one or more associate communication devices of each of the one or more associates according to the selection of types of emergency alert messages to be transmitted.

In a third embodiment of the present disclosure, a method of communicating emergency information corresponding to an emergency alert message of a public emergency alert system can involve identifying a subscriber of a communication system that is in a zone of coverage of the emergency alert message; identifying one or more associate communication devices for each of one or more associates corresponding to the subscriber; transmitting the emergency information to one or more subscriber communication devices of the subscriber; and transmitting the emergency information to at least one of the one or more associate communication devices when the emergency alert message corresponds to a selection of types of emergency alert messages to be transmitted to the one or more associate communication devices, wherein the selection is made by at least one of the subscriber and the one or more associates.

In a fourth embodiment of the present disclosure, a network element of a communication system, can have a controller element to send an emergency alert message of a public emergency alert system for a zone of coverage to one or more communication devices of a message recipient, wherein the emergency alert message is sent based at least in part on presence information associated with the message recipient.

FIG. 1 depicts an exemplary embodiment of a mobile communication device 116 communicating by way of wired and/or wireless access points (WAPs) with other communication devices and/or a network proxy 122 which collectively operate in a communication system 100. The communication device 116 can be a multimode VoIP terminal. However, the present disclosure contemplates the use of other types of communication devices, including other types of voice, video and data devices. The communication system 100 can comprise a packet-switched network 105. The packet-switched network can be an Internet Service Provider (ISP) network 105. The network 105 can be coupled to the network proxy 122, a cellular network 113 and network devices or elements, including network devices located in one or more of the buildings 112 representing an enterprise or residence. The ISP network 105 utilizes technology for transporting Internet traffic.

In an enterprise setting, the building 112 can include a gateway 114 that provides voice and/or video connectivity services between communication devices 116, such as VoIP terminals or other forms of communication devices of enterprise personnel. In a residential setting, the building 112 can include a gateway 114 represented by, for example, a residential gateway coupled to central office 106 utilizing conventional telephonic switching for processing calls with third parties.

The network proxy 122 can be used to control operations of a media gateway 109, the central office 106, and/or the gateway 114. Communications between the network proxy 122, the communication devices 116 and other network devices of the communication system 100 can conform to any number of signaling protocols such as a session initiation protocol (SIP), SS7, or a video communications protocol such as H.323 which combines video and voice over a packet-switched network, as well as cryptographic protocols, such as transport layer security (TLS) or secure sockets layer (SSL), to provide secure communications for data transfers.

The network proxy 122 can comprise a communications interface 124 that utilizes common technology for communicating over an IP interface with the network 105, the central office 106, the media gateway 109, the cellular network 113, and/or the gateway 114. By way of the communications interface 124, the network proxy 122 can direct by common means any of the foregoing network devices to establish packet switched data, voice, and/or video connections between communication devices 116 distributed throughout the communication system 100. The network proxy 122 can further comprise a memory 126 (such as a high capacity storage medium) embodied in this illustration as a database, and a controller 128 that makes use of computing technology such as a desktop computer, or scalable server for controlling operations of the network proxy 122. The network proxy 122 can operate as an IP Multimedia Subsystem (IMS) conforming in part to protocols defined by standards bodies such as 3GPP (Third Generation Partnership Protocol).

Under the control of the network proxy 122, the media gateway 109 can link packet-switched and circuit-switched technologies such as the cellular network 113 (or central office 106) and the network 105, such as an ISP network. The media gateway 109 can conform to a media gateway control protocol (MGCP) also known as H.248 defined by work groups in the Internet Engineering Task Force (IETF). This protocol can handle signaling and session management needed during a multimedia conference. The protocol defines a means of communication which converts data from the format required for a circuit-switched network to that required for a packet-switched network. MGCP can therefore be used to set up, maintain, and terminate calls between multiple disparate network elements of the communication system 100. The media gateway 109 can therefore support hybrid communication environments for communication devices 116, including VoIP terminals.

The central office 106 can house common network switching equipment for distributing local and long-distance telecommunication services supplied by network 105 to buildings 112 (such as dwellings or commercial enterprises). Telecommunication services of the central office 106 can include traditional POTS (Plain Old Telephone Service) and broadband services such as HDTV, DSL, VoIP (Voice over Internet Protocol), IPTV (Internet Protocol Television), Internet services, and so on. The communication system 100 can utilize common computing and communications technologies to support circuit-switched and/or packet-switched communications, including MPLS.

Communication system 100 can comprise various data switches or other network devices that can manage network traffic to one or more users, such as communication devices 116. The data switches can be various network elements utilized for control of network traffic, including digital subscriber line access multipliers (DSLAMs), routers, and asynchronous transfer mode (ATM) switches.

The cellular network 113 can support voice and data services over a number of access technologies such as GSM-GPRS, EDGE, CDMA-1X, UMTS, WiMAX, software defined radio (SDR), and other known and future technologies. The cellular network 113 can be coupled to base stations 127 under a frequency-reuse plan for communicating over-the-air with roaming VoIP terminals 116.

Additionally, the network proxy 122 can be coupled to a Public Service Access Point (PSAP) 150 and/or an Emergency Alert Service (EAS) 160 by traditional means, such as the central office 106, media gateway 109 and/or network 105. The PSAP 150 and/or the EAS 160 can generate emergency broadcast and response services, such as an Emergency Alert Message (e.g., tornado or thunderstorm warning).

To manage operations in relation to the PSAP 150 and/or EAS 160 including emergency services, the communication system 100 can comprise an emergency system (ES) 170 for managing distribution of emergency notices, and a presence system (PS) 180 for supplementing the services provided by the ES 170. The ES 170 can be utilized for directed distribution of emergency notices to parties designated by an end user of such service. Each of the ES 170 and the PS 180 can be incorporated with the network proxy 122, including sharing common components and/or can be independent systems that comprise a controller coupled to a memory operating as a database that stores relevant information, such as subscriber information. The controllers and memory can utilize common scalable computing and storage technologies.

Figure 2:
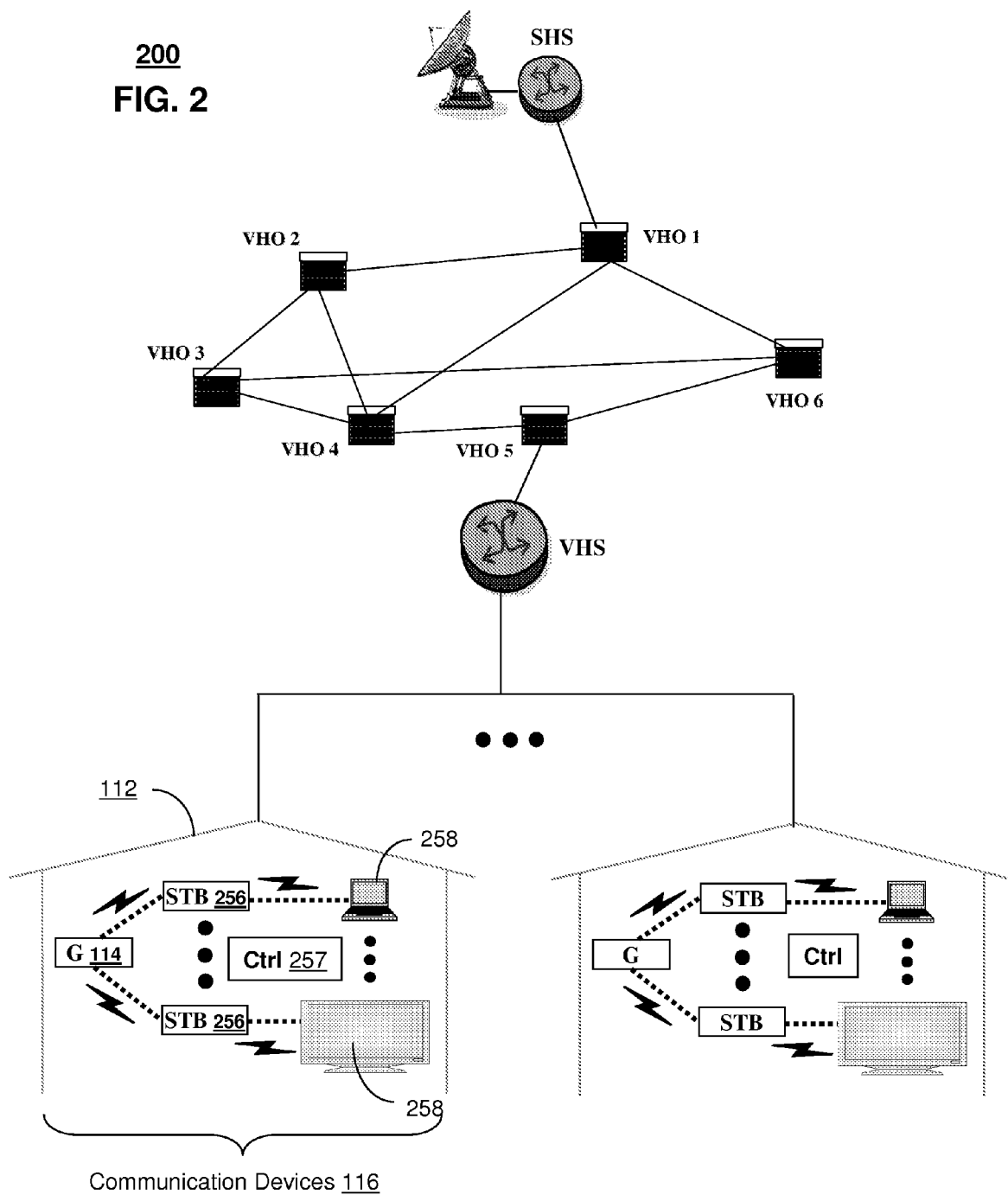

FIG. 2 depicts an exemplary embodiment of a communication system 200 embodying an IPTV service. Communication system 200 can be overlaid or operably coupled with communication system 100 as another representative embodiment of communication system 100. In a typical IPTV backbone, there is at least one super head office server (SHS) which receives national media programs from satellite and/or media servers from service providers of multimedia broadcast channels. The SHS server forwards IP packets associated with the media content to video head servers (VHS) via a network of video head offices (VHO) according to a common multicast communication method. The VHS then distributes multimedia broadcast programs to commercial and/or residential buildings 112 housing the gateway 114 (e.g., a residential gateway or RG) that distributes broadcast signals to receivers such as Set-Top Boxes (STBs) 256 which in turn present broadcast selections or media programs to media devices 258 such as computers or television units managed in some instances by a media controller 257 (e.g., an infrared or RF remote control).

Unicast traffic can also be exchanged between the STBs 256 and the subsystems of the IPTV communication system 200 for services such as video-on-demand (VoD). Although not shown, the aforementioned multimedia system can also be combined with analog broadcast distributions systems.

Figure 3:
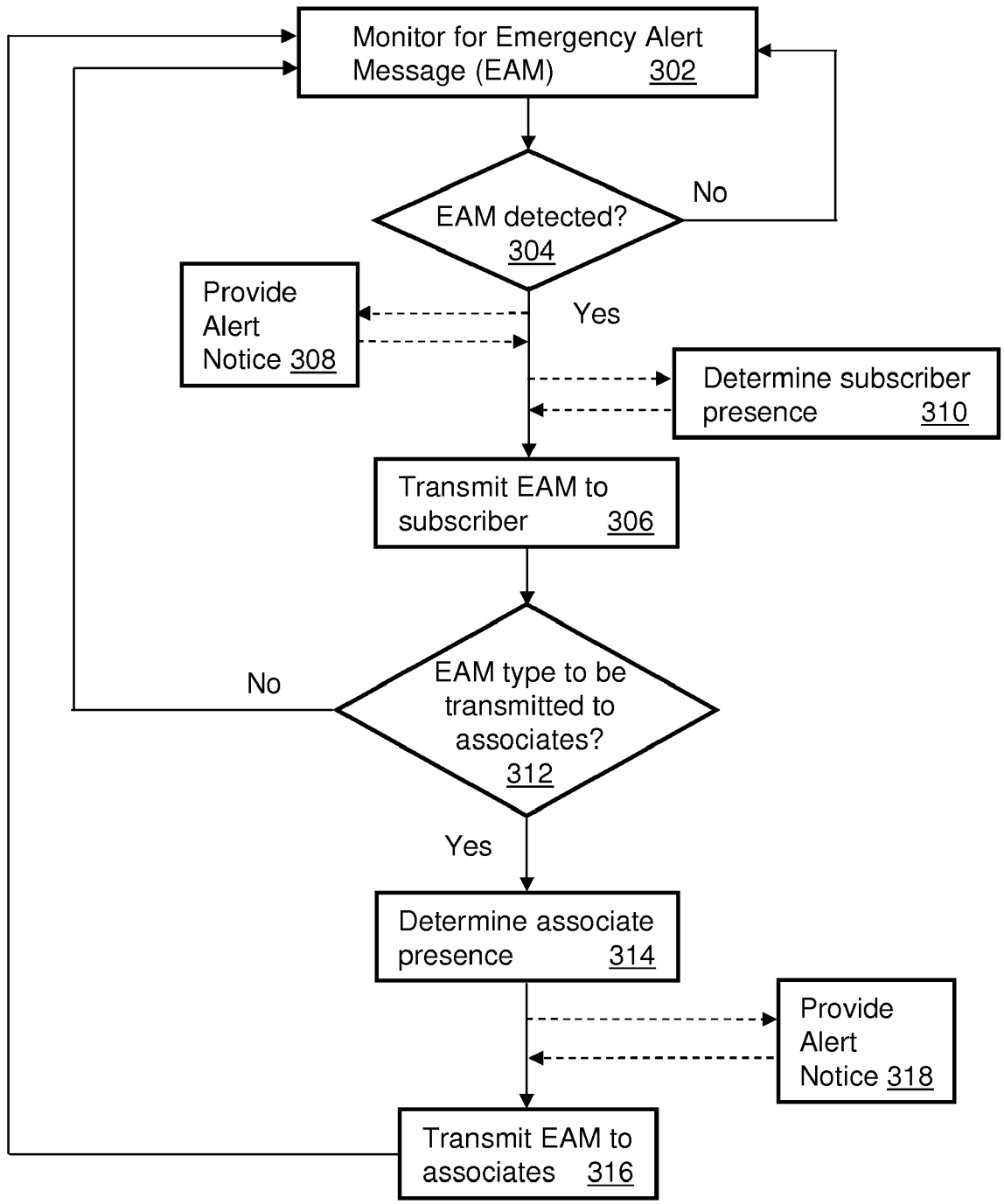
FIG. 3 depicts an exemplary method operating in one or more of the systems of FIGS. 1-2.

FIG. 3 depicts an exemplary method 300 operating in portions of the systems 100 and/or 200. Method 300 has variants as depicted by the dashed lines. It would be apparent to an artisan with ordinary skill in the art that other embodiments not depicted in FIG. 3 are possible without departing from the scope of the claims described below.

Method 300 begins with step 302 in which the network proxy 122 can monitor for emergency alert messages that are broadcast by a public emergency alert system, such as the PSAP 150 and EAS 160 of FIG. 1. As described above, the monitoring can be performed by a separate system, such as emergency system 170. If an emergency alert message is detected in step 304 then this information can be provided to a subscriber of the communication system that is in the zone of coverage corresponding to the emergency alert message. If on the other hand, the emergency alert message is not detected then the network proxy 122 can continue to monitor for such messages.

Where the emergency alert message is detected, then in step 306 the emergency alert message can be transmitted to one or more communication devices 116 of the subscriber. The emergency alert message can be transmitted in whole or in part. In another embodiment, information representative of the emergency alert message can be transmitted. For example, an audio emergency alert message can be transmitted as a text message to a cellular phone, which can be a verbatim message or can paraphrase the message. The present disclosure also contemplates supplemental information being provided with all or a portion of the emergency alert message. For example, if the emergency alert message is a tornado warning which provides the geographic location and time associated with the warning, the network proxy 122 can supplement the message with other information, including more detailed data and safety instructions.

In one embodiment, an alert notice can be provided to the subscriber's communication devices, such as a distinctive ring tone or a synthesized voice message, as in step 308. The alert notice can be different for different types of emergency alert message. For example, a tornado warning can have a distinct tone that a subscriber can readily discern from a thunderstorm watch. In one embodiment, a subscriber can select the type of alert notice to be associated with one or more of the types of emergency alert messages. In another embodiment, a subscriber can choose to not receive the emergency alert message after receipt of the alert notice. For example, a subscriber can receive an alert notice corresponding to a marine advisory and can deny receipt of the emergency alert message, such as through keying in a denial code in a cellular phone, to avoid having to listen to a lengthy marine advisory message that may not be pertinent to the subscriber.

In another embodiment, the network proxy 122 can in step 310 retrieve or otherwise obtain presence information corresponding to the communication devices 116 of the subscriber. Presence information can be derived from the presence system 180 of FIG. 1, and/or from other sources, such as Global Positioning System (GPS) coordinate information received by the network proxy 122 directly from one or more of the subscriber's communication devices 116. The presence information can also include device activity information which can be used to hone in on which device is most likely used by a targeted user. The presence information can be derived by numerous techniques, and can vary depending upon the particular type of communication device. For example, the network proxy 122 can monitor various communication devices 116 associated with the subscriber, such as a cellular phone in transit which is being detected by a series of base stations or a computer that is exhibiting network activity. Such activities, as well as others, can be indicative of use by the subscriber or a likelihood of success in contacting the subscriber.

In step 312, the network proxy 122 can determine whether the emergency alert message is of a type that is to be transmitted to associates of the subscriber. The associates of the subscriber can be various individuals and/or entities, including family, friends, emergency personnel and so forth. The associates can be located in various places, including in proximity to the subscriber or remote from the subscriber. One or more of the associates can be subscribers of other service providers that can be placed in communication with the network proxy 122, such as through the network 105.

The types of emergency alert messages to be transmitted can be determined based upon a number of techniques. In one embodiment, a pre-selection of types of emergency alert messages to be transmitted to associates can be made by the subscriber and/or the associates of the subscriber. For example, a subscriber can determine that more serious emergency alert messages (e.g., tornado or hurricane warnings) should be transmitted to associates but less serious or less pertinent emergency alert messages (e.g., marine advisory for someone who does not go boating) should not be transmitted to the associates. In another embodiment, the associates can make the selection of the types of emergency alert messages to be received, such as where the associates know the subscriber has limited mobility and thus desire to know of all emergency alert messages that pertain to the subscriber. The pre-selection can be made through the communication device 116 of the subscriber and/or by other techniques, such as a registration process.

In another embodiment, a subscriber can select whether the emergency alert message is of a type to be transmitted to the associates at or in proximity to the time of receipt of the emergency alert message. For example, a subscriber can receive the emergency alert message or an alert notice corresponding to the emergency alert message, and can deny transmission of the emergency alert message to the associates, such as through keying in a denial code in a cellular phone, to avoid the associates receiving an emergency alert message that may not be pertinent to the subscriber.

If the emergency alert message is to be transmitted to one or more of the associates of the subscriber, then in step 314 the network proxy 122 can retrieve or otherwise obtain presence information corresponding to the communication devices 116 of the associates. The presence information can be derived from the presence system 180 of FIG. 1, and can be derived by numerous techniques, as well as vary depending upon the particular type of communication device. If on the other hand the emergency alert message is not of a type that is to be transmitted to associates of the subscriber, then the network proxy 122 can continue to monitor for emergency alert messages as back in step 302.

Once presence information is obtained for the one or more associates of the subscriber, then in step 316 the emergency alert message can be transmitted to the associates. The emergency alert message can be transmitted in whole or in part to the associates, as well as information representative of the emergency alert message and/or supplemental information.

From the foregoing descriptions, it would be evident to an artisan with ordinary skill in the art that the aforementioned embodiments can be modified, reduced, or enhanced without departing from the scope and spirit of the claims described below. For example, the emergency alert message, or information representative thereof or supplemental thereto, can be communicated to various devices and combinations of devices, including a cell phone, a computer, an IPTV, a VoIP terminal, a POTS terminal, and a telematics system in an automobile. A subscriber and/or associates of the subscriber can select different types of messages to be received by different associates, such as more serious emergency alert messages being transmitted to a first group of associates and less serious messages being transmitted to a second group of associates. The particular number and configuration of the groups of associates can be varied. The subscriber and/or the associates can indicate which of their communication devices should receive the emergency alert messages. This can also be varied depending on the type of emergency alert message, such as more serious messages being transmitted to all known communication devices of the subscriber and/or associates, while less serious messages are to be transmitted to only select devices. In another example, the transmitted emergency information corresponding to the emergency alert message can vary, such as providing more detailed emergency information to a first group of associates and less detailed emergency information to a second group of associates. These are but a few examples of the modifications that can be applied to the present disclosure without departing from the scope of the claims. Accordingly, the reader is directed to the claims for a fuller understanding of the breadth and scope of the present disclosure.

Figure 4:
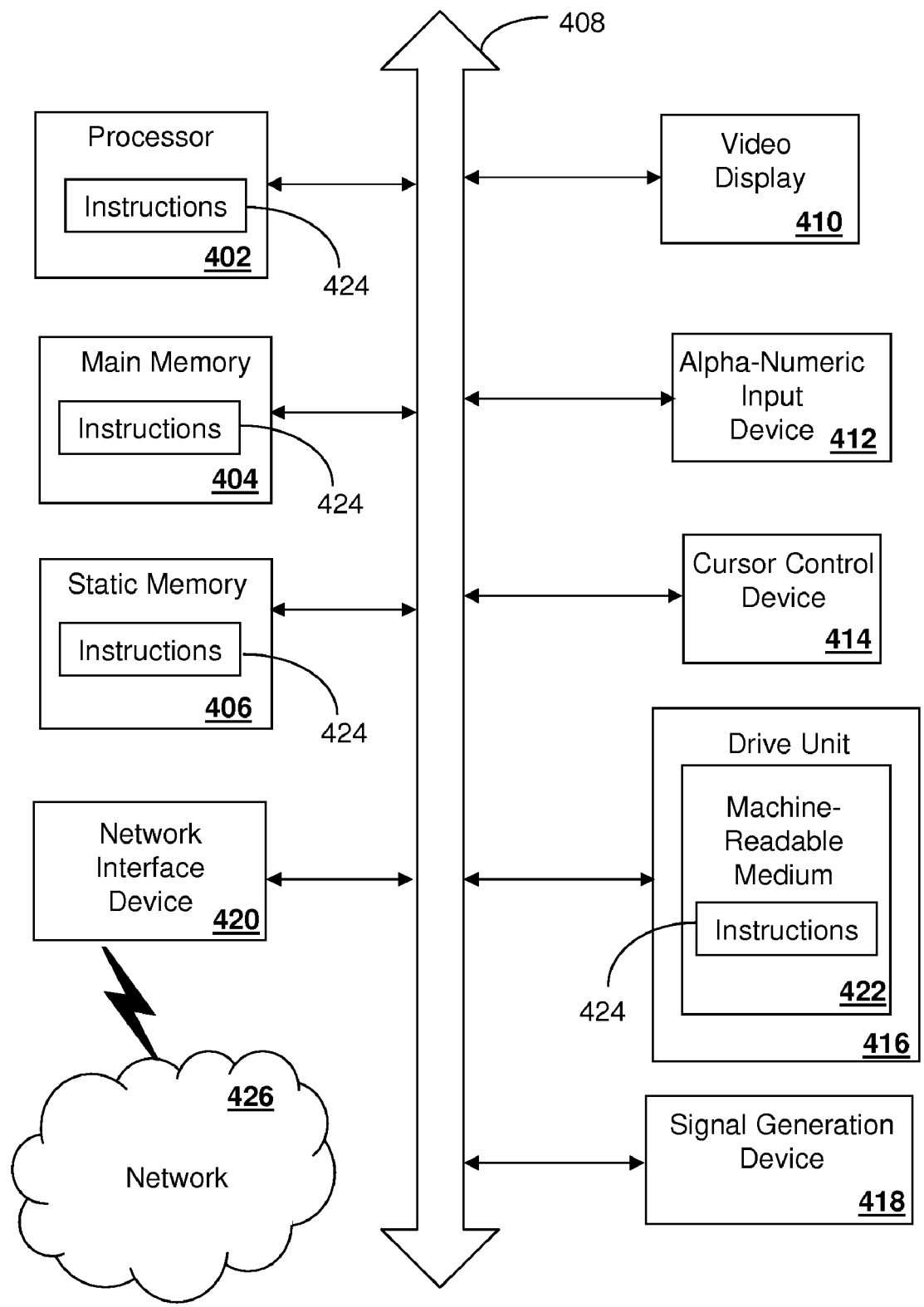
FIG. 4 depicts an exemplary diagrammatic representation of a machine in the form of a computer system within which a set of instructions, when executed, may cause the machine to perform any one or more of the methodologies disclosed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a mass storage medium 416, a signal generation device 418 (e.g., a speaker or remote control) and a network interface device 420.

The mass storage medium 416 may include a computer-readable storage medium 422 on which is stored one or more sets of instructions (e.g., software 424) embodying any one or more of the methodologies or functions described herein, including those methods illustrated above. The computer-readable storage medium 422 can be an electromechanical medium such as a common disk drive, or a mass storage medium with no moving parts such as Flash or like non-volatile memories. The instructions 424 may also reside, completely or at least partially, within the main memory 404, the static memory 406, and/or within the processor 402 during execution thereof by the computer system 400. The main memory 404 and the processor 402 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the computer-readable storage medium 422 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-readable storage medium of a communication system, comprising computer instructions for:
   detecting an emergency alert message broadcast by a public emergency alert system for a zone of coverage;
   identifying one or more subscribers of the communication system that are in the zone of coverage;
   identifying one or more associate communication devices for each of one or more associates of the one or more subscribers;
   providing types of emergency alert messages to be transmitted to the one or more associate communication devices;
   receiving a selection of the types of emergency alert messages to be transmitted;
   receiving associate presence information corresponding to the one or more associate communication devices; and
   transmitting the emergency alert message to at least one of the one or more associate communication devices based on the associate presence information when the emergency alert message corresponds to the selection of the types of emergency alert messages to be transmitted, wherein:
      the selection of the types of emergency alert messages to be transmitted is a pre-selection prior to the detecting of the emergency alert message; and
      the pre-selection is made by at least one among the one or more subscribers and the one or more associates.

2. The storage medium of claim 1, wherein the associate presence information is based at least in part on activity of the one or more associate communication devices that is indicative of a likelihood of success in communicating with the one or more associates.

3. The storage medium of claim 1, comprising computer instructions for identifying one or more subscriber communication devices for each of the one or more subscribers, wherein the types of emergency alert messages to be transmitted are provided to the one or more subscriber communication devices in proximity to a time that the emergency alert message is transmitted to the one or more subscriber communication devices.

4. The storage medium of claim 1, comprising computer instructions for:
   identifying one or more subscriber communication devices for each of the one or more subscribers; and
   transmitting the emergency alert message to the one or more subscriber communication devices, wherein the one or more subscriber communication devices comprise at least one wireless communication device.

5. The storage medium of claim 1, wherein the one or more associate communication devices comprise at least one wireless communication device.

6. The storage medium of claim 1, comprising computer instructions for:
   identifying one or more subscriber communication devices for each of the one or more subscribers;
   receiving subscriber presence information corresponding to the one or more subscriber communication devices; and
   transmitting the emergency alert message to the one or more subscriber communication devices based at least in part on the subscriber presence information.

7. The storage medium of claim 1, comprising computer instructions for:
   transmitting an alert notice to the at least one of the one or more associate communication devices prior to transmitting the emergency alert message to the at least one of the one or more associate communication devices, wherein the one or more associates can decline receipt of the emergency alert message based upon the alert notice.

8. The storage medium of claim 1, comprising computer instructions for:
   identifying one or more subscriber communication devices for each of the one or more subscribers; and
   transmitting the emergency alert message to the one or more subscriber communication devices, wherein the one or more subscriber communication devices comprise at least one among a set-top box, a computer, a fixed communication device, a short-range portable communication device, and a cellular communication device.

9. The storage medium of claim 1, wherein the one or more associate communication devices comprise at least one among a set-top box, a computer, a fixed communication device, a short-range portable communication device, and a cellular communication device.

10. A network entity comprising circuitry for:
    detecting an emergency alert message broadcast by a public emergency alert system for a zone of coverage;
    identifying one or more subscribers of the communication system that are in the zone of coverage;
    identifying one or more associate communication devices for each of one or more associates of the one or more subscribers;
    providing types of emergency alert messages to be transmitted to the one or more associate communication devices;
    receiving a selection of the types of emergency alert messages to be transmitted;
    receiving associate presence information corresponding to the one or more associate communication devices; and
    transmitting the emergency alert message to at least one of the one or more associate communication devices based on the associate presence information when the emergency alert message corresponds to the selection of the types of emergency alert messages to be transmitted, wherein:
       the selection of the types of emergency alert messages to be transmitted is a pre-selection prior to the detecting of the emergency alert message; and
       the pre-selection is made by at least one among the one or more subscribers and the one or more associates.

11. The network entity of claim 10, wherein the associate presence information is based at least in part on activity of the one or more associate communication devices that is indicative of a likelihood of success in communicating with the one or more associates.

12. The network entity of claim 10, comprising circuitry further for:
   identifying one or more subscriber communication devices for each of the one or more subscribers, wherein the types of emergency alert messages to be transmitted are provided to the one or more subscriber communication devices in proximity to a time that the emergency alert message is transmitted to the one or more subscriber communication devices.

13. The network entity of claim 10, comprising circuitry further for
   identifying one or more subscriber communication devices for each of the one or more subscribers; and
   transmitting the emergency alert message to the one or more subscriber communication devices, wherein the one or more subscriber communication devices comprise at least one wireless communication device.

14. The network entity of claim 10, wherein the one or more associate communication devices comprise at least one wireless communication device.

15. The network entity of claim 14, comprising circuitry further for:
   identifying one or more subscriber communication devices for each of the one or more subscribers;
   receiving subscriber presence information corresponding to the one or more subscriber communication devices; and
   transmitting the emergency alert message to the one or more subscriber communication devices based at least in part on the subscriber presence information.

16. The network entity of claim 10, comprising circuitry further for:
   transmitting an alert notice to the at least one of the one or more associate communication devices prior to transmitting the emergency alert message to the at least one of the one or more associate communication devices, wherein the one or more associates can decline receipt of the emergency alert message based upon the alert notice.

17. The network entity of claim 10, comprising circuitry further for:
   identifying one or more subscriber communication devices for each of the one or more subscribers; and
   transmitting the emergency alert message to the one or more subscriber communication devices, wherein the one or more subscriber communication devices comprise at least one among a set-top box, a computer, a fixed communication device, a short-range portable communication device, and a cellular communication device.

18. The network entity of claim 10, wherein the one or more associate communication devices comprise at least one among a set-top box, a computer, a fixed communication device, a short-range portable communication device, and a cellular communication device.

19. A method of communicating emergency information corresponding to an emergency alert message of a public emergency alert system, the method comprising:
   identifying a subscriber of a communication system that is in a zone of coverage of the emergency alert message;
   identifying one or more associate communication devices for each of one or more associates corresponding to the subscriber;
   transmitting the emergency information to one or more subscriber communication devices of the subscriber; and
   transmitting the emergency information to at least one of the one or more associate communication devices when the emergency alert message corresponds to a selection of types of emergency alert messages to be transmitted to the one or more associate communication devices, wherein:
      the selection is made by at least one of the subscriber and the one or more associates; and
      the selection of types of emergency alert messages to be transmitted to the one or more associate communication devices is a pre-selection prior to a detection of the emergency alert message.

20. The method of claim 19, wherein the emergency information is transmitted to the at least one of the one or more associate communication devices based at least in part on presence information corresponding to the one or more associate communication devices.

21. The method of claim 20, wherein the presence information is based at least in part on activity of the one or more associate communication devices that is indicative of a likelihood of success in communicating with the one or more associates.

22. The method of claim 19, wherein the emergency information is transmitted to the one or more subscriber communication devices based at least in part on presence information corresponding to the one or more subscriber communication devices.

23. The method of claim 22, wherein the presence information is based at least in part on activity of the one or more subscriber communication devices that is indicative of a likelihood of success in communicating with the subscriber.

24. The method of claim 19, wherein the selection of types of emergency alert messages to be transmitted to the one or more associate communication devices is sent in proximity to a time that the emergency alert message is received by the one or more subscriber communication devices.

25. A network element, comprising circuitry for:
   identifying a subscriber of a communication system that is in a zone of coverage of an emergency alert message;
   identifying one or more associate communication devices for each of one or more associates corresponding to the subscriber;
   transmitting the emergency information to one or more subscriber communication devices of the subscriber; and
   transmitting the emergency information to at least one of the one or more associate communication devices when the emergency alert message corresponds to a selection of types of emergency alert messages to be transmitted to the one or more associate communication devices, wherein:
      the selection is made by at least one of the subscriber and the one or more associates; and
      the selection of types of emergency alert messages to be transmitted to the one or more associate communication devices is a pre-selection prior to a detection of the emergency alert message.

26. The network element of claim 25, wherein the presence information is based at least in part on the one or more associate communication devices that is indicative of a likelihood of success in communicating with the one or more associates.

27. The network element of claim 25, wherein the emergency information is transmitted to the at least one of the one or more associate communication devices based at least in part on presence information corresponding to the one or more associate communication devices.

28. The network element of claim 27, wherein the emergency information is transmitted to the one or more subscriber communication devices based at least in part on presence information corresponding to the one or more subscriber communication devices.

* * * * *